(12) United States Patent
Mochizuki et al.

(10) Patent No.: US 10,198,227 B2
(45) Date of Patent: Feb. 5, 2019

(54) ELECTRONIC APPARATUS AND IMAGE FORMING APPARATUS

(71) Applicant: KYOCERA Document Solutions Inc., Osaka (JP)

(72) Inventors: Chigusa Mochizuki, Osaka (JP); Makiko Sato, Osaka (JP); Akifumi Seto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/559,142

(22) PCT Filed: Mar. 29, 2016

(86) PCT No.: PCT/JP2016/060159
§ 371 (c)(1),
(2) Date: Sep. 18, 2017

(87) PCT Pub. No.: WO2016/158966
PCT Pub. Date: Oct. 6, 2016

(65) Prior Publication Data
US 2018/0067708 A1     Mar. 8, 2018

(30) Foreign Application Priority Data
Apr. 2, 2015 (JP) .................................. 2015-076167

(51) Int. Cl.
*G06F 3/12*     (2006.01)
*B41J 29/38*    (2006.01)
(Continued)

(52) U.S. Cl.
CPC ............ *G06F 3/1259* (2013.01); *B41J 29/38* (2013.01); *B41J 29/46* (2013.01); *G03G 21/00* (2013.01);
(Continued)

(58) Field of Classification Search
CPC ...................................................... G06F 3/1259
(Continued)

(56) References Cited

U.S. PATENT DOCUMENTS 6,213,652 B1    4/2001   Suzuki et al.
6,606,163 B1    8/2003   Suzuki et al.
(Continued)

FOREIGN PATENT DOCUMENTS

JP      H08-292850 A    11/1996

OTHER PUBLICATIONS

The first office action in CN mailed by SIPO (State Intellectual Property office) dated Oct. 31, 2018 in the corresponding Chinese Patent Application No. 201680017788.4.

*Primary Examiner* — King Y Poon
*Assistant Examiner* — Michael L Burleson
(74) *Attorney, Agent, or Firm* — IP Business Solutions, LLC

(57) ABSTRACT

An electronic apparatus includes an operation unit or a terminal device for inputting address information of the terminal device of a user who instructed execution of a job, and notification target information indicating whether the terminal device is a notification target to which an interruption of the job is to be notified, a network interface unit that performs data communication with a plurality of the terminal devices, and a controller that decides, when an interruption of the job is detected, whether the terminal device is the notification target, according to the notification target information, and causes the network interface unit to transmit interruption data indicating that the job has been interrupted to the terminal device, using the address information of the terminal device, when the terminal device is the notification target.

4 Claims, 4 Drawing Sheets

(51) Int. Cl.
  *B41J 29/46* (2006.01)
  *G03G 21/00* (2006.01)
  *H04N 1/00* (2006.01)
  *H04N 1/23* (2006.01)
  *H04N 1/32* (2006.01)

(52) U.S. Cl.
  CPC .............. *G06F 3/12* (2013.01); *G06F 3/1207* (2013.01); *H04N 1/00* (2013.01); *H04N 1/00127* (2013.01); *H04N 1/2376* (2013.01); *H04N 1/32* (2013.01); *G03G 21/0005* (2013.01); *G06F 3/121* (2013.01); *H04N 1/00477* (2013.01)

(58) Field of Classification Search
  USPC ........................................................ 358/1.15
  See application file for complete search history.

(56) References Cited

U.S. PATENT DOCUMENTS

| | | |
|---|---|---|
| 6,906,813 B1* | 6/2005 | Tuchitoi ................ G06F 3/1204 358/1.1 |
| 7,148,991 B2 | 12/2006 | Suzuki et al. |
| 7,630,092 B1 | 12/2009 | Suzuki et al. |
| 7,884,960 B2 | 2/2011 | Suzuki et al. |
| 7,978,355 B2 | 7/2011 | Suzuki et al. |
| 2004/0008363 A1 | 1/2004 | Suzuki et al. |
| 2007/0044101 A1 | 2/2007 | Suzuki et al. |
| 2009/0180142 A1 | 7/2009 | Suzuki et al. |
| 2012/0013946 A1* | 1/2012 | Imai ................... G03G 15/6576 358/1.15 |

* cited by examiner

ELECTRONIC APPARATUS AND IMAGE FORMING APPARATUS

TECHNICAL FIELD

The present invention relates to an electronic apparatus and an image forming apparatus, and more particularly to a technique to notify an interruption of a job.

BACKGROUND ART

Recently, electronic apparatuses such as an image forming apparatus are given a function to notify a finish of a job to a terminal device, for example via E-mail, utilizing a communication protocol such as SMB or FTP. Such a function becomes available when the user registers E-mail address information, in advance of starting the job. The function enables the user to be aware that the job has been finished, thereby improving the convenience in use.

For example, Patent Literature (PTL) 1 discloses an image forming system that performs data communication with a terminal device. The system sets, when standby control information is received from the terminal device together with the job, a standby state for start of the job or a standby state for finish of the job, and transmits message information to the terminal device. Upon receipt of the message information, the terminal device notifies the user that the standby control has been set for the start of the job or finish of the job, according to the message information.

CITATION LIST

Patent Literature

[PTL 1] Japanese Unexamined Patent Application Publication No. H08-292850

SUMMARY OF INVENTION

Technical Problem

However, in the system that employs the mentioned technique to notify the finish of the job to the terminal device, or transmit the message information to the terminal device upon finishing the job, in case that the job is interrupted for some reason, the notice of the finish of the job, or the message information is unable to be transmitted to the terminal device, because the job remains uncompleted. In such a case, the user is made to wait for the finish of the job in vain for a long time, or left unaware that the job has been interrupted until the user moves to check the image forming apparatus. Thus, the work efficiency of the user is degraded.

The present invention has been accomplished in view of the foregoing situation, and provides a technique to notify the interruption of the job to the terminal device of the user, when the job is interrupted, to thereby improve the convenience in use for the user.

Solution to Problem

In an aspect, the present invention provides an electronic apparatus including an input unit for inputting address information of a terminal device of a user who instructed execution of a job, and notification target information indicating whether the terminal device is a notification target to which an interruption of the job is to be notified, a data communication unit that performs data communication with a plurality of the terminal devices, a decision unit that decides whether any of a plurality of the jobs instructed to the electronic apparatus has been interrupted, and a controller that decides, when the decision unit decides that one of the jobs has been interrupted, whether any of the plurality of terminal devices is designated as the notification target associated with the job, according to the notification target information, and causes the data communication unit to transmit, when one of the terminal devices is designated as the notification target, interruption data indicating that the job has been interrupted, to the terminal device designated as the notification target, using the address information of the terminal device designated as the notification target.

In another aspect, the present invention provides an image forming apparatus including the foregoing electronic apparatus, and an image forming unit that forms an image on a recording medium. The job is related to an image forming operation performed by the image forming unit.

Advantageous Effects of Invention

The aforementioned configuration enables, when a job is interrupted, the interruption to be notified to the terminal device of the user, to thereby improve the user-friendliness of the apparatus.

DESCRIPTION OF EMBODIMENTS

Hereafter, some embodiments of an image forming apparatus, exemplifying the electronic apparatus according to the present invention, will be described with reference to the drawings.

First Embodiment

Figure 1:
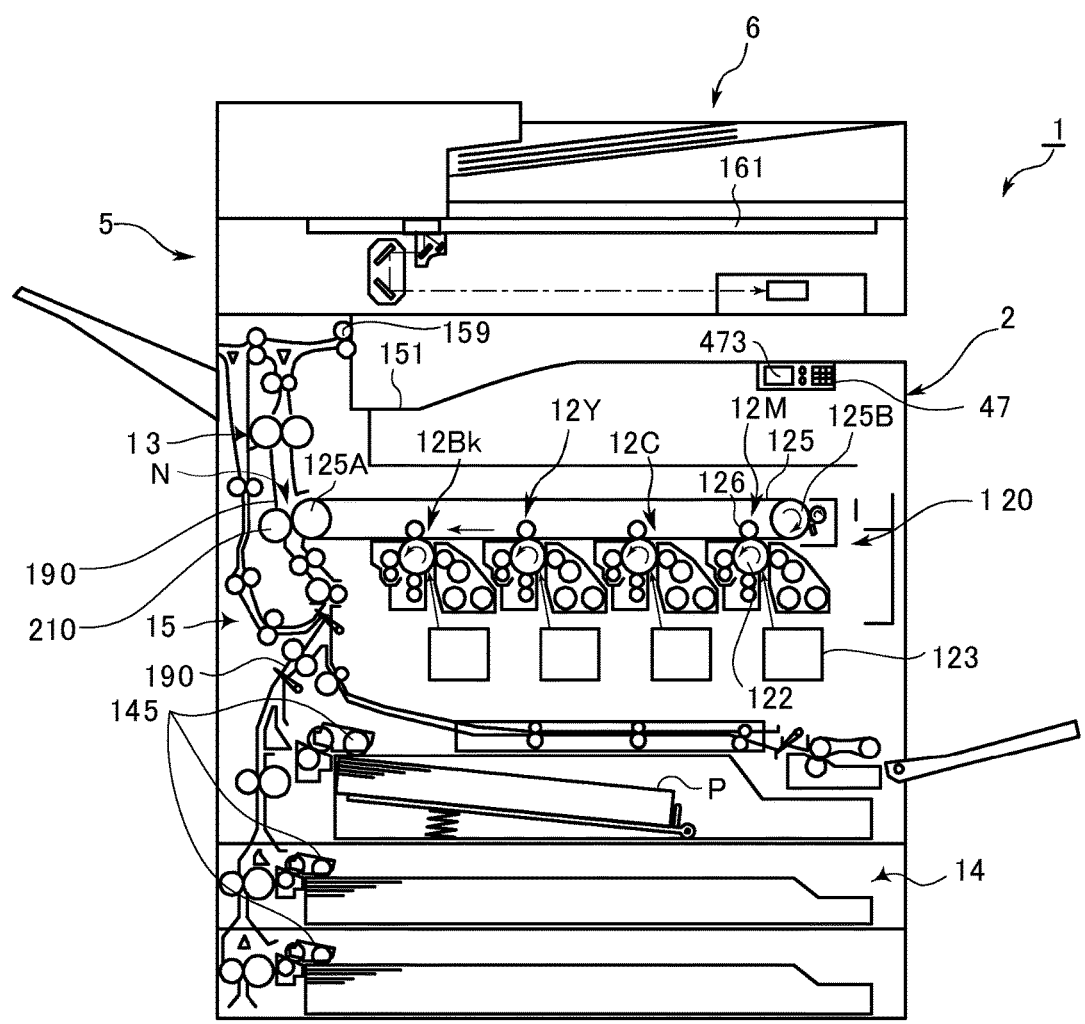
FIG. 1 is a showing an appearance of an image forming apparatus according to a first embodiment of the present invention.

FIG. 1 is a showing an appearance of an image forming apparatus according to a first embodiment of the present invention. The image forming apparatus 1 according to the embodiment of the disclosure is a multifunction peripheral having a plurality of functions, such as copying, printing, scanning, and facsimile transmission. The image forming apparatus 1 includes an operation unit 47, an image forming unit 120, a fixing unit 13, a paper feed unit 14, a transport unit 15, a document feeder 6, and an image scanner unit (ISU) 5, which are mounted inside a main body 2.

The operation unit 47 receives instructions from the user, for operations and processes that the image forming apparatus 1 is configured to perform, such as image forming and document reading.

When the image forming apparatus 1 performs the document reading operation, the ISU 5 optically reads the image on a source document delivered from the document feeder 6 or placed on a contact glass (platen glass) 161, and generates image data. The image data generated by the ISU 5 is stored in a built-in HDD or a computer connected to a network.

When the image forming apparatus 1 performs the image forming operation, the image forming unit 120 forms a toner image on a recording sheet P serving as a recording medium and delivered from the paper feed unit 14, on the basis of the image data generated through the document reading operation, the image data received from the computer connected to the network or a user terminal device such as a smartphone, or the image data stored in the built-in HDD.

Image forming subunits 12M, 12C, 12Y, and 12Bk of the image forming unit 120 each include a photoconductor drum 122, a charging unit that uniformly charges the surface of the photoconductor drum 122, a laser scanning units (LSU) 123 that exposes the surface of the photoconductor drum 122 to light to thereby form thereon an electrostatic latent image, a developing unit that develops the electrostatic latent image on the surface of the photoconductor drum 122 to a toner image, and a primary transfer roller 126.

In the case of color printing, the image forming subunit 12M for magenta, the image forming subunit 12C for cyan, the image forming subunit 12Y for yellow, and the image forming subunit 12Bk for black in the image forming unit 120 each expose the surface of the photoconductor drum 122 after uniformly charging, to form the electrostatic latent image representing the image of the corresponding color component, and develop the electrostatic latent image on the surface of the photoconductor drum 122 with the toner of the corresponding color component so as to form the toner image on the photoconductor drum 122. Then the toner image is transferred onto an intermediate transfer belt 125 spanned around a drive roller 125A and a slave roller 125B, via the primary transfer roller 126.

The intermediate transfer belt 125 includes an image carrying surface formed on the outer circumferential surface, onto which the toner image is transferred, and is driven by the drive roller 125A, in contact with the circumferential surface of the photoconductor drum 122. The intermediate transfer belt 125 endlessly runs between the drive roller 125A and the slave roller 125B, in synchronization with the photoconductor drum 122.

The toner images of the respective colors are superposed at an adjusted timing when transferred onto the intermediate transfer belt 125, so as to form a colored toner image. A secondary transfer roller 210 transfers the colored toner image formed on the surface of the intermediate transfer belt 125 onto the recording sheet P transported along a transport route 190 from the paper feed unit 14, at a nip region N of a drive roller 125A engaged with the intermediate transfer belt 125. Then the fixing unit 13 fixes the toner image on the recording sheet P by thermal pressing. The recording sheet P having the colored image formed and fixed thereon is discharged to an output tray 151.

The paper feed unit 14 includes a plurality of paper feed cassettes. When the user designates a size of the recording sheet P through the operation unit 47, a pickup roller 145 of the paper feed cassette in which the sheets of the designated size are placed is driven to rotate, to thereby transport the recording sheet P to the transport route 190 of the transport unit 15.

The transport unit 15 includes the transport route 190, a plurality of transport roller pairs arranged along the transport route 190, a resist roller pair located upstream of the nip region N in the recording sheet transport direction, and a discharge roller pair 159 located at the terminal of the transport route 190, and serves to transport the recording sheet to the output tray 151, through the nip region N and the fixing unit 13.

Figure 2:
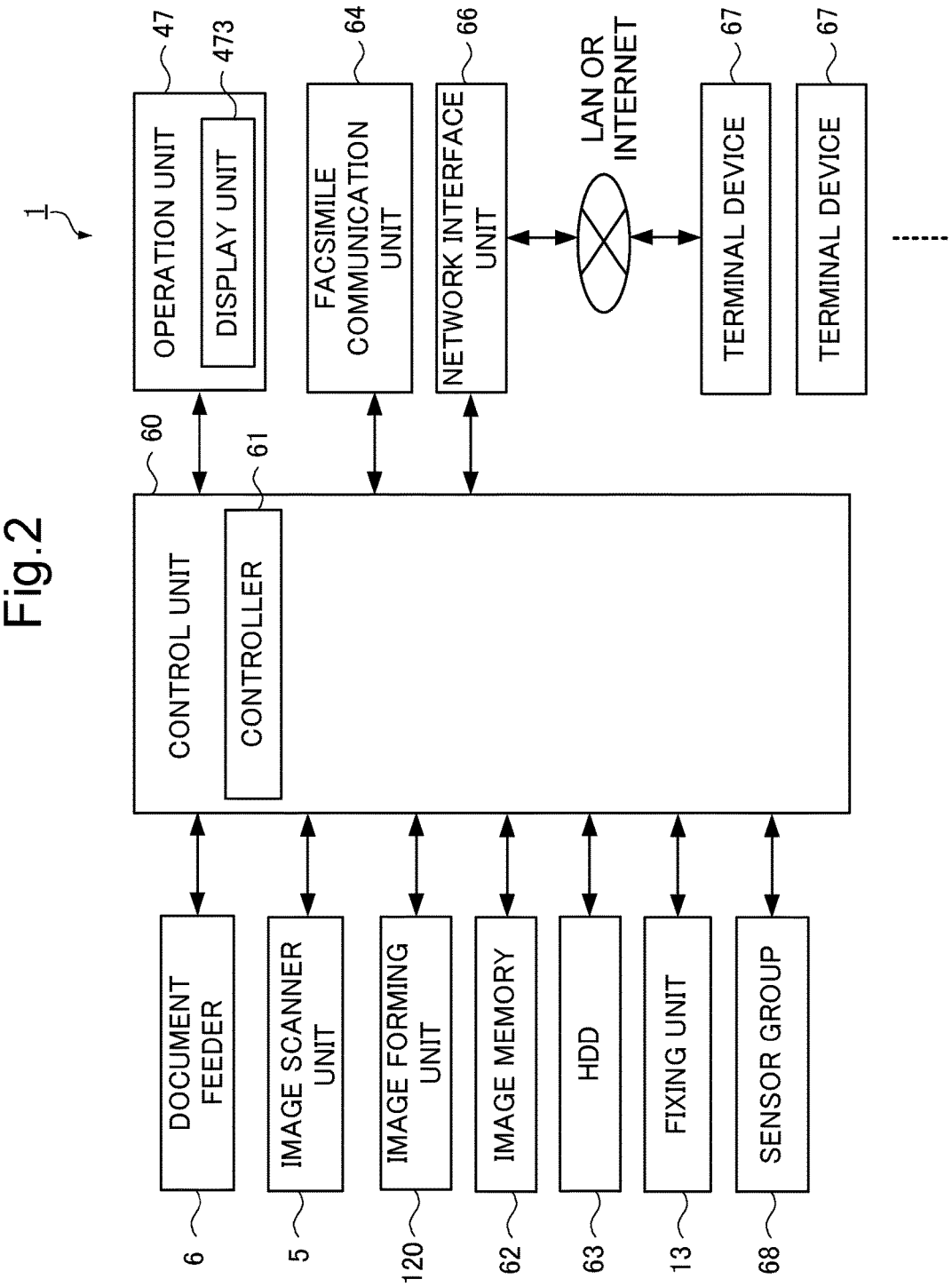
FIG. 2 is a functional block diagram showing an essential internal configuration of the image forming apparatus.

Hereunder, a configuration of the image forming apparatus 1 will be described. FIG. 2 is a functional block diagram showing an essential internal configuration of the image forming apparatus 1.

The image forming apparatus 1 includes a control unit 60, the ISU 5, the document feeder 6, the fixing unit 13, the image forming unit 120, the operation unit 47, an image memory 62, a HDD 63, a facsimile communication unit 64, and a network interface unit 66. The elements described above with reference to FIG. 1 are given the same numeral.

The control unit 60 includes a central processing unit (CPU), a RAM, a ROM, and an exclusive hardware circuit. The control unit 60 includes the controller 61.

The controller 61 is connected to the control unit 60, the ISU 5, the document feeder 6, the fixing unit 13, the image forming unit 120, the operation unit 47, the image memory 62, the HDD 63, the facsimile communication unit 64, the network interface unit 66, and a sensor group 68, to control the entirety of the image forming apparatus 1.

The operation unit 47 includes various hard keys, a display unit 473 that displays, for example, operation guides for the user, and a touch panel provided on the display unit 473. The touch panel detects a touch operation made on each of a plurality of buttons displayed in the screen of the display unit 473. When the hard key or the button in the screen of the display unit 473 is operated, the operation unit 47 notifies the inputted content, for example a numeral or a selected item, to the controller 61.

The network interface unit 66 includes a communication module such as a LAN board, to transmit and receive data to and from a terminal device 67 such as a personal computer in the local area or in the Internet, through a network such as the LAN connected to the network interface unit 91.

The image memory 62 is a region for temporarily storing the image data of the source document acquired by the ISU 5, and data to be printed by the image forming unit 120.

The HDD 63 is a large-capacity storage device for storing source images acquired, for example, by the ISU 5.

The sensor group 68 detects various types of operation errors that are likely to provoke an interruption of the operation of the image forming apparatus 1, and outputs the detection result to the controller 61.

With the foregoing configuration, the user can instruct a job that utilizes one of the facsimile communication function, the copying function, the printer function, and the scanner function, by operating the operation unit 47. The controller 61 manages the jobs thus inputted. For example, when a job that utilizes the copying function is inputted by the user through the operation unit 47, the controller 61 drives the ISU 5 and the document feeder 6 so as to read the image of the source document, and causes the image forming unit 120 to print the image of the document on the recording sheet. When a job that utilizes the facsimile function is inputted by the user through the operation unit 47, the controller 61 drives the ISU 5 and the document feeder 6 so as to read the image of the source document, and causes the facsimile communication unit 64 to transmit image data representing the image to the destination terminal, through the public telephone circuit.

In addition, execution of a job that utilizes one of the mentioned functions can be instructed to the image forming apparatus 1, from the terminal device 67 such as a personal computer, through the network. For example, the print data can be transmitted, and also the execution of the job that utilizes the printer function or facsimile function can be instructed, from the terminal device 67 to the image forming apparatus 1 using a known communication protocol, so that the controller 61 in the image forming apparatus 1 executes the instructed job, on the basis of the print data.

Further, under the control of the controller 61, the finish of the job or interruption of the job can be notified from the image forming apparatus 1 to the terminal device 67, for example via E-mail, utilizing the communication protocol such as SMB or FTP. Such a notification function becomes available, under the control of the controller 61, in the case where the user inputs, at the time of instructing the job, the E-mail address information of the terminal device 67 through the operation unit 47, or registers the address information by transmitting the address information from the terminal device 67 to the image forming apparatus 1, together with the print data.

In a system that simply notifies the finish of the job, as in the conventional system, in case that the job is interrupted for some reason, the notice of the finish of the job is not notified to the terminal device 67. In such a case, the user is made to wait for the finish of the job in vain for a long time, or left unaware that the job has been interrupted until the user moves to check the image forming apparatus, and thus the remedy for the interruption is delayed.

In this embodiment, in contrast, not only the finish of the job but also the interruption of the job is notified, and therefore the user can promptly deal with the interruption, upon receipt of the notice of interruption of the job.

Figure 3:
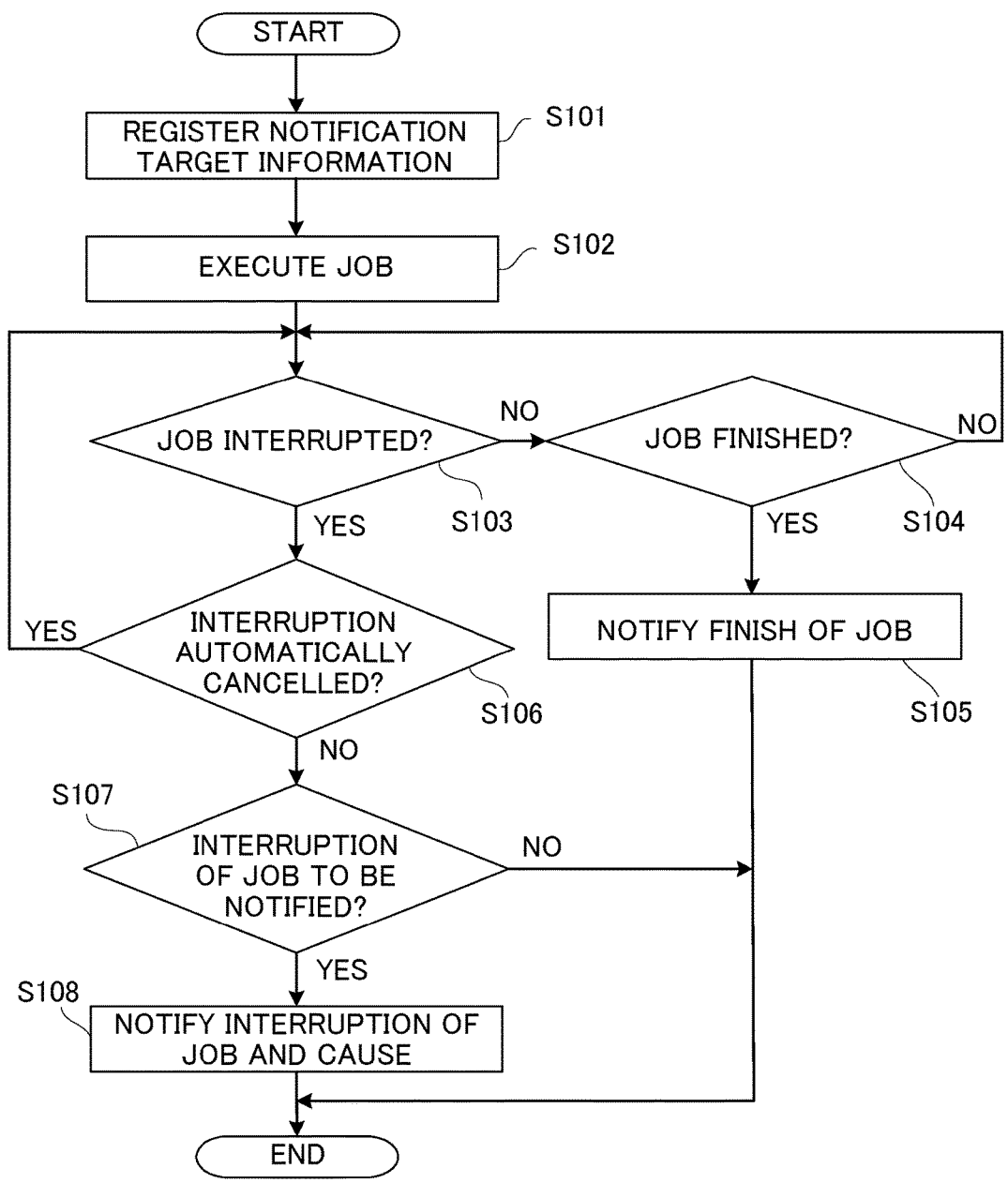
FIG. 3 is a flowchart showing a process of notifying an interruption of a job to a terminal device, according to the first embodiment.

Hereunder, a process of notifying the interruption of the job according to this embodiment will be described. FIG. 3 is a flowchart showing the mentioned process.

For example, at the time of instructing the execution of a job that utilizes the copying function or facsimile function of the image forming apparatus 1, the user inputs the E-mail address information of the terminal device 67 through the operation unit 47, and also the instruction to transmit the notice of interruption of the job, if desired. When the E-mail address information is inputted, the controller 61 stores, in the HDD 63, the address information, as well as notification target information, indicating whether the notice of interruption of the job is required, in the case where the transmission of the notice of interruption of the job is instructed (step S101 in FIG. 3).

The user then sets the source document on the document feeder 6, and inputs the instruction to execute the job that utilizes the copying function or facsimile function, through the operation unit 47.

Alternatively, the user may operate his/her own terminal device 67, so as to set the print data and instruct the image forming apparatus 1 to execute the job that utilizes the copying function or facsimile function of the image forming apparatus 1. In this case, the user operates the terminal device 67 so as to input therein the E-mail address information of the terminal device 67, and the instruction to transmit the notice of interruption of the job, if desired. The terminal device 67 stores therein the E-mail address information inputted, as well as the notification target information, indicating whether the notice of interruption of the job is required, in the case where the instruction of the notice of interruption of the job is inputted.

When the user instructs the execution of the job through the terminal device 67, the terminal device 67 transmits the print data to the image forming apparatus 1 through the network, utilizing a known communication protocol, and instructs the image forming apparatus 1 to execute the job that utilizes the printer function or facsimile function. At this point, the terminal device 67 transmits the E-mail address information and the notification target information to the image forming apparatus 1, together with the print data.

The image forming apparatus 1 receives the print data through the network interface unit 66, and stores the print data in the HDD 63 (step S101 of FIG. 3). In addition, the image forming apparatus 1 receives the E-mail address information and the notification target information through the network interface unit 66, and stores the information in the HDD 63. Thus, the controller 61 designates the job received from the terminal device 67 as an object of management, and stores the address information and the notification target information associated with the job.

The controller 61 sequentially executes the jobs designated as the object of management, according to the waiting list (step S102 of FIG. 3). Upon receipt of the instruction to execute the job, the controller 61 drives the ISU 5 and the document feeder 6 so as to read the image of the source document, and temporarily stores the image data representing the image of the source document, in the image memory 62. In the case where the copying function is utilized for the job, the controller 61 causes the image forming unit 120 to form the image corresponding to the image data, on the recording sheet. In the case where a plurality of source documents are set, or when the number of copies is instructed through the operation unit 47, the images of the respective source documents are printed, on the designated number of recording sheets. In the case where the facsimile function is utilized for the job, the controller 61 causes the facsimile communication unit 64 to transmit the image data to the destination terminal, through the public telephone circuit.

For example, the controller 61 may analyze print data, when executing the printing job, and temporarily store the image data represented by the print data in the image memory 62. Then the controller 61 may cause the image forming unit 120 to print the image corresponding to the image data on the recording sheet, or may cause the facsimile communication unit 64, when executing the facsimile job, to transmit the image data to the destination terminal, through the public telephone circuit.

The job that utilizes the copying function, the facsimile function, or another function, is executed as described above. The controller 61 decides, each time the job is executed, whether the job has been interrupted, and whether the job has been finished (step S103, S104 of FIG. 3). The controller 61 may decide that the job has been interrupted, for example, when a paper jam is detected during the execution of the job, on the basis of a detection result from the sensor group 68. In the case where all the processes associated with the job have been completed, without any malfunction such as a paper jam, the controller 61 decides that the job has been finished.

Upon deciding that an ongoing job has been finished (NO at step S103, YES at step S104 of FIG. 3), the controller 61 reads out, from the HDD 63, the address information of the terminal device 67 stored in association with the job that has been finished, creates an E-mail for notifying the finish of the job, applies the address information to the E-mail, and transmits the E-mail to the network through the network interface unit 66 (step S105 of FIG. 3). Thus, the process of FIG. 3 is finished.

The E-mail is received by the terminal device 67, and displayed in the screen of the display unit of the terminal device 67, by the operation of the user. At this point, the user can be aware that the job has been finished.

In the case where the controller 61 decides that the ongoing job has been interrupted (YES at step S103 FIG. 3), instead of deciding that the job has been finished (NO at step S104 of FIG. 3), the controller 61 identifies the cause of the interruption of the job. An interruption cause data table, in which, for example, the detection results from the sensor group 68 and operation status of the functional components, acquired at the time that the job has been interrupted, and possible causes of the interruption are registered in association with one another, is stored in advance in the HDD 63. The controller 61 acquires the detection results from the sensor group 68 corresponding to the time that the job has been interrupted, and the operation status of the functional components at the time that the job has been interrupted, and looks up the interruption cause data table, to thereby identify the cause of the interruption.

Then the controller 61 decides whether the cause of the interruption of the job can be automatically eliminated (step S106 of FIG. 3). For example, when a calibration task programmed to be periodically performed is automatically started, the job is temporarily suspended. However, when the calibration is finished, the cause of the interruption is eliminated. In such a case, the controller 61 decides that the cause of the interruption of the job can be automatically eliminated.

Upon deciding that the cause of the interruption of the job can be automatically eliminated (YES at step S106 of FIG. 3), the controller 61 stands by until the cause is eliminated, and resumes the when the cause is eliminated. Thus, the process returns to steps S103 and S104.

In contrast, for example, when the sensor group 68 detects a jam of the recording sheet, the cause of the interruption is unable to be automatically eliminated. Accordingly, the controller 61 decides that the cause of the interruption is not automatically eliminated (NO at step S106 of FIG. 3). In this case, the controller 61 reads out the notification target information from the HDD 63 to decide whether the interruption of the job has to be notified to the terminal device 67, on the basis of the notification target information (step S107 of FIG. 3). When it is decided, for example, that the notice of interruption of the job is not required (NO at step S107 of FIG. 3), the controller 61 finishes the process of FIG. 3, without notifying the interruption of the job. In this case, therefore, the user remains unaware of the interruption of the job.

In contrast, when the controller 61 decides that the interruption of the job has to be notified to the terminal device 67, on the basis of the notification target information (YES at step S107 of FIG. 3), the controller reads out the address information of the terminal device 67 from the HDD 63, creates an E-mail for notifying the interruption of the job and the cause of the interruption (interruption data), and transmits the E-mail to the address indicated by the address information, through the network interface unit 66 (step S108 of FIG. 3).

The E-mail is received by the terminal device 67, and displayed in the screen of the display unit of the terminal device 67, by the operation of the user. Accordingly, the user can be aware of the interruption of the job, and promptly deal with the interruption.

In this embodiment, in the case where a plurality of users require the notice of interruption of the job from the respective terminal devices 67, the interruption of the job is notified to each of those users.

In the case of "Yes" at S103 in this embodiment, the controller 61 decides whether the cause of the interruption of the job can be automatically eliminated (step S106 of FIG. 3), and also decides, on the basis of the notification target information, whether the interruption of the job is to be notified to the terminal device 67 (step S107 of FIG. 3). Alternatively, after "Yes" is selected at S103, the controller 61 may (i) skip S106 and S107 and proceed to S108, or (ii) skip S107 after "No" is selected at S106, and proceed to S108.

Further, although at S108 the controller 61 is programmed to transmit both the notice of interruption of the job and the cause of the interruption, to the terminal device 67 designated as the destination of the notice of interruption, the controller 61 may instead transmit only the notice of interruption of the job to the terminal device 67 designated as the destination of the notice of interruption.

Second Embodiment

In a second embodiment, although the image forming apparatus 1 having the same configuration as FIG. 1 and FIG. 2 is employed, it will be assumed that the image forming apparatus 1 manages a plurality of jobs and sequentially executes those jobs, in response to either job instructions inputted through the operation unit 47, or job instructions received from at least one terminal device 67. When the ongoing job is interrupted, the image forming apparatus 1 selects the terminal device 67 to which the interruption is to be notified, as the case may be, and notifies the interruption of the job only to the selected terminal device 67. However, the second embodiment is not intended to restrict the image forming apparatus 1 according to the first embodiment from managing a plurality of jobs and sequentially executing those jobs.

In the second embodiment, the interruption of the job is notified to only one of the terminal devices 67 that have instructed the job, because when the job is interrupted it suffices that one user deals with the interruption of the job. In the case where the interruption of the job is notified to the plurality of terminal devices 67, a plurality of users try to deal with the cause of the interruption at the same time, in which case many of the users are involved in useless or meaningless works.

Figure 4:
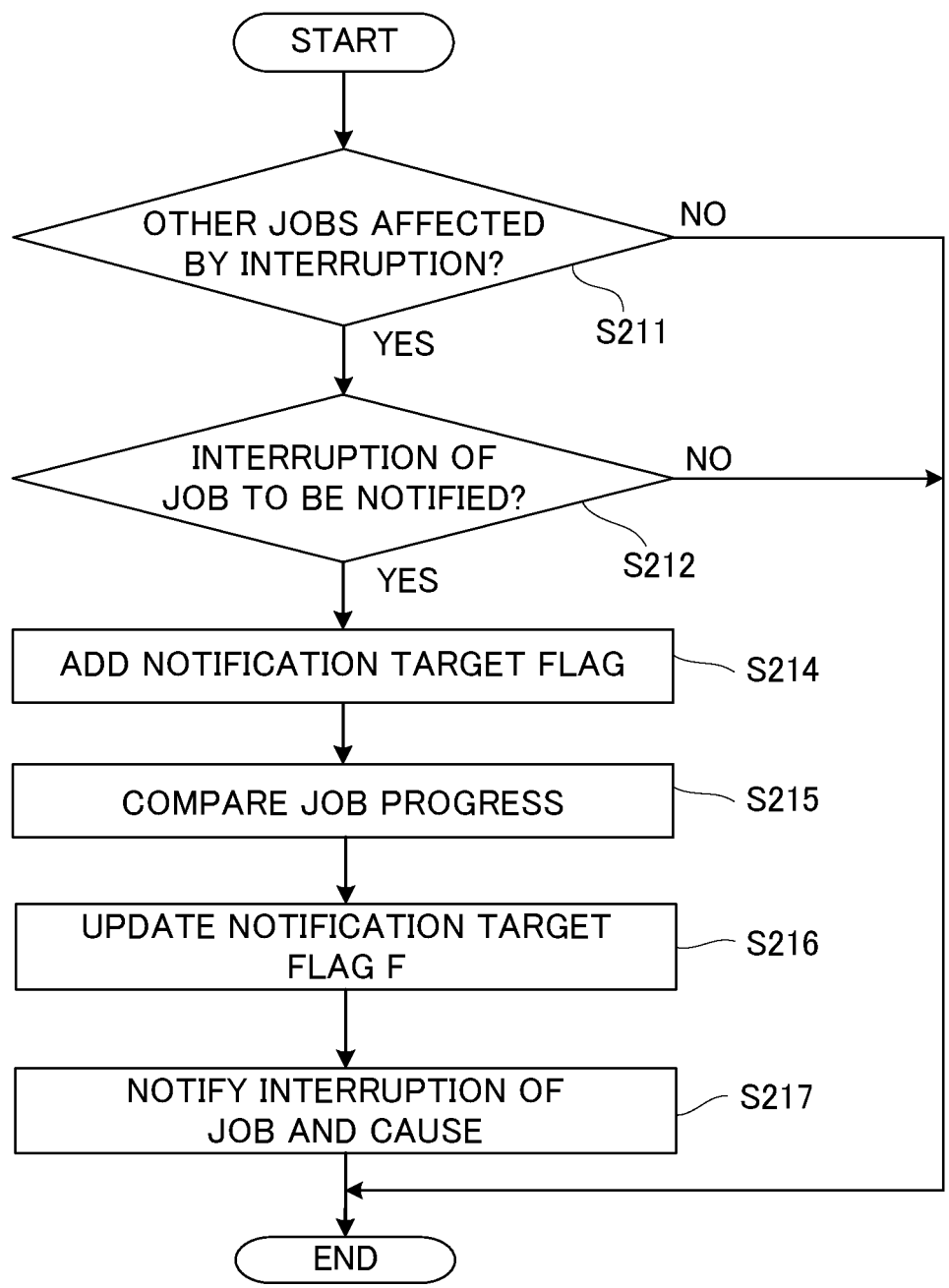
FIG. 4 is a flowchart showing a process of notifying the interruption of the job to the terminal device, according to a second embodiment.

Hereunder, description will be given regarding the process of selecting one of the terminal devices 67 as may be appropriate, and notifying the interruption of the job only to the selected terminal device 67. FIG. 4 is a flowchart showing the process of selecting one of the plurality of terminal devices 67 as may be appropriate, and notifying the interruption of the job only to the selected terminal device 67. Here, the description of the same steps as those of FIG. 3 according to the first embodiment will not be repeated.

In the second embodiment also, the process of steps S101 to S108 according to the first embodiment is performed. However, in addition, in the second embodiment the controller 61 decides, after S108, whether any of the other jobs managed by the controller 61 is affected by the cause of the interruption of the interrupted job, thus to be also interrupted (step S211). For example, a job data table, in which types of jobs that may be affected by the cause of the interruption are listed with respect to a plurality of categories of the cause of the interruption, is stored in advance in the HDD 63. The controller 61 has already identified the cause of the interruption by looking up the interruption cause data table, and can therefore decide whether the job that is the subject of S211 is affected by the cause of the interruption, by looking up the job data table. In the case where, for example, the job is interrupted because the recording sheet is jammed (cause of the interruption) on the transport route 190 upstream or downstream of the image forming unit 120 while the job that utilizes the copying function is performed, such a cause of the interruption affects other jobs including the image forming, for example the job that utilize the printer function. Accordingly, in the job data table, the copying function, the printer function, and the facsimile function are listed as types of jobs that may be affected by the corresponding cause of the interruption, specified as jamming of the recording sheet on the transport route 190.

In contrast, the jobs that utilize the scanner function, in which the ISU 5 is employed but the image forming unit 120 and the transport route 190 are not employed, is not affected by the jamming of the recording sheet. Therefore, in the job data table, the jobs related to the scanner function are not listed as types of jobs that may be affected by the cause of the interruption specified as jamming of the recording sheet on the transport route 190.

In the case where the controller 61 decides that none of the jobs that are the subject of S211 are stored in the job data table as the job that may be affected by the cause of the interruption currently identified (NO at step S211), the controller 61 finishes the process.

In the case where the controller 61 decides that one or more of the jobs that are the subject of S211 are stored in the job data table as the job that may be affected by the cause of the interruption currently identified (YES at step S211), the controller 61 reads out, from the HDD 63, the notification target information of the terminal device 67 that has instructed the execution of the job stored in the job data table, and decides whether the job interruption of the job is to be notified to the terminal device 67, on the basis of the notification target information (step S212).

When the notification target information of any one of the jobs indicates that the notice of interruption of the job has to be notified (YES at step S212), the controller 61 adds a notification target flag F to such jobs and the job decided as interrupted at S103 (step S214). In the case where the notification target information of none of the jobs stored in the job data table indicates that the notice of interruption of the job has to be notified (NO at step S212), the controller 61 finishes the process.

Then the controller 61 compares the state of progress of the jobs to which the notification target flag F was added at S214 (step S215).

The controller 61 keeps the notification target flag F added to the job in the first place in state of progress among the jobs to which the notification target flag F has been added, and removes the notification target flag F from all the remaining jobs (step S216).

As comparison method of the state of progress at step S215, for example, the controller 61 compares the order of the job execution sequence among the jobs to which the notification target flag F was added at S214. At step S216, the controller 61 decides that the job in the first place in job execution sequence (first in the waiting list) is the job in the first place in state of progress, and keeps only the notification target flag F added to such a job.

Here, it will be assumed that, among the jobs to which the notification target flag F was added at S214, the job in the first place in job execution sequence is a copying operation, the job in the second place in job execution sequence is a printing operation, and the printing operations follow in the third and subsequent places in job execution sequence. It will also be assumed that the controller 61 is driving the ISU 5 so as to read a source document as a part of the copying operation in the first place in job execution sequence and, at the same time, driving the image forming unit 120 to form an image as a part of the printing operation in the second place in job execution sequence. In case that a paper jam occurs on the transport route 190 under the mentioned condition, the controller 61 compares between the process of reading the remaining source documents and printing the required number of sheets in the copying operation in the first place in job execution sequence, and the process of printing the remaining number of sheets in the printing operation in the second place in job execution sequence second (step S215), and decides that the job that can be completed earlier is the job in the first place in state of progress, and keeps only the notification target flag F added to such a job (step S216).

Through the process from step S211 to step S216, the job that has been interrupted, and also the job about which the notice of interruption is required and the job in the first place in state of progress, are selected from among the jobs that are affected by the cause of the interruption, and the notification target flag F is added only to the selected jobs. In the case where the notice of interruption is required with respect to none of the jobs, the notification target flag F is added to none of the jobs.

Thereafter, in the case where any of the jobs is accompanied with the notification target flag F, the controller 61 notifies the interruption of that job to the terminal device 67 that instructed the execution of the same job, through the network interface unit 66 (step S217). The controller 61 reads out the address information of the terminal device 67 from the HDD 63, creates an E-mail for notifying the interruption of the job and the cause of the interruption (interruption data), and causes the network interface unit 66 to transmit the E-mail to the address indicated by the address information. At this point, the process is finished.

The E-mail is received by the terminal device 67, and displayed in the screen of the display unit of the terminal device 67, by the operation of the user. Accordingly, the interruption of the job is notified only to the terminal device 67 of the user who has instructed the execution of the job in the first place in state of progress, and who has requested the notice of interruption, so as to allow only such a user to deal with the interruption. Therefore, the remaining users are exempted from being involved in a useless work.

In the second embodiment, the interruption of the job is notified to the terminal device 67 that has instructed the execution of the job in the first place in state of progress, and that has requested the notice of interruption, through the process from S214 to S216, the interruption of the job may be notified to all those terminal devices 67 about which, according to S212, the notification target information indicates that the notice of interruption of the job is required.

Further, although at S217 the controller 61 is programmed to transmit both the notice of interruption of the job and the cause of the interruption, to the terminal device 67 designated as the destination of the notice of interruption, the controller 61 may instead transmit only the notice of interruption of the job to the terminal device 67 designated as the destination of the notice of interruption.

Although the image forming apparatus according to the foregoing embodiment is exemplified by the color MFP, the present invention may also be applied to a monochrome MFP or other electronic apparatuses including other types of image forming apparatuses, such as a printer, a copier, and a facsimile machine.

Further, the configurations and processing according to the foregoing embodiment, described above with reference to FIG. 1 to FIG. 4, are merely exemplary and in no way intended to limit the configurations and processing of the present invention.

The invention claimed is:

1. An electronic apparatus comprising:
an input unit for inputting address information of a terminal device that has instructed execution of a job, and notification target information indicating whether the terminal device is a notification target to which an interruption of the job is to be notified;
a data communication unit that performs data communication with a plurality of the terminal devices;
a sensor group that detects an operation error;
a decision unit that decides, on a basis of a detection result from the sensor group, whether the job has been interrupted for each of a plurality of the jobs instructed to the electronic apparatus;
a storage unit that stores in advance an interruption cause data table in which the detection result from the sensor group is registered in association with a cause of the interruption, and a job data table in which types of jobs that are affected by the interruption are listed with respect to the cause of the interruption; and
a controller, wherein
the controller:
decides, when the decision unit decides that any of the plurality of the jobs has been interrupted, the cause of the interruption on a basis of the interruption cause data table;
decides, on a basis of the job data table and the decided cause of the interruption, whether each of other lobs different from the job decided as interrupted among the plurality of the jobs is affected by the interruption;
decides, on a basis of the notification target information, whether there is the terminal device designated as the notification target among the terminal device that has instructed execution of the job decided as interrupted and the terminal device that has instructed execution of the other jobs decided as affected by the interruption; and
in deciding that there is the terminal device designated as the notification target, selects the terminal device the job of which is in a first place in state of progress, from among the terminal devices designated as the notification target, and causes the data communication unit to transmit interruption data that includes information indicating the interruption of the instructed job and information indicating the cause of the interruption to the selected terminal device, using the address information of the selected terminal device.

2. The electronic apparatus according to claim 1, wherein the controller decides whether the cause of the interruption is automatically eliminated by a function of the electronic apparatus, and transmits the interruption data in a case where the cause of the interruption is not automatically eliminated and detains the interruption data in a case where the cause of the interruption is automatically eliminated.

3. The electronic apparatus according to claim 1, wherein the controller decides that the job that can be completed first is the job in the first place in state of progress, among the job decided as interrupted and the other jobs that may be affected by the interruption, and selects the terminal device that has instructed the job in the first place, as destination for transmitting the interruption data.

4. An image forming apparatus comprising:
the electronic apparatus according to claim 1, and
an image forming unit that forms an image on a recording medium,
wherein the job is related to an image forming operation performed by the image forming unit.

* * * * *